(12) United States Patent
Fairchild

(10) Patent No.: US 6,515,959 B1
(45) Date of Patent: Feb. 4, 2003

(54) RAMP MOTION MECHANISM

(75) Inventor: Scot C. Fairchild, Santa Clara, CA (US)

(73) Assignee: Terastor Corporation, San Jose, CA (US)

( * ) Notice: Subject to any disclaimer, the term of this patent is extended or adjusted under 35 U.S.C. 154(b) by 0 days.

(21) Appl. No.: 09/470,259

(22) Filed: Dec. 22, 1999

(51) Int. Cl.⁷ .............................. G11B 21/22; G11B 5/54
(52) U.S. Cl. .................. 369/300; 360/254.3; 360/254.6
(58) Field of Search ........................... 360/254.3, 254.4, 360/254.6; 369/300

(56) References Cited

U.S. PATENT DOCUMENTS

| | | | | |
|---|---|---|---|---|
| 5,463,514 A | * | 10/1995 | Yeager | 360/105 |
| 5,831,795 A | | 11/1998 | Ma et al. | 360/105 |
| 5,995,332 A | * | 11/1999 | Patterson | 360/105 |
| 6,115,214 A | * | 9/2000 | Allsup et al. | 360/105 |
| 6,163,439 A | * | 12/2000 | Jeong | 360/254.3 |

\* cited by examiner

Primary Examiner—Robert S. Tupper
(74) Attorney, Agent, or Firm—Fish & Richardson P.C.

(57) ABSTRACT

A method and an apparatus for providing a highly repeatable loading/unloading pathway for a read/write head of a disk drive.

21 Claims, 6 Drawing Sheets

RAMP MOTION MECHANISM

BACKGROUND

The present invention relates to a ramp motion mechanism used to load and unload a read-write head to and from a surface of a data storage medium.

Data storage is an important aspect of today's information technology. Great efforts have been made by the storage industry to increase the areal data density of a storage medium in order to meet the ever increasing demand for higher capacity storage devices. Various types of disks, including magnetic disks and optical disks, constitute recording media.

Magnetic storage devices such as fixed or removable magnetic disks and tapes are widely-used conventional storage devices. The state-of-art conventional magnetic hard drive systems can achieve extremely high linear bit densities, especially with the new MR and GMR magnetic heads. For example, the areal density of many hard disk drives is on the order of about one gigabits per square inch.

Optical storage devices are emerging as an alternative technology to the conventional magnetic technology because of their potential for high density data storage. The areal density of an optical storage device, in principle, is only limited by the diffraction limit of an illuminating optical beam for reading or writing. One type of commercial optical storage technology is based on magneto-optical materials. These materials can currently produce an areal data density of about one gigabits per square inch.

Generally, each data storage device includes a spindle motor for rotating one or more disks containing data, a head assembly for recording data onto and reproducing data from the disks, and an actuator for moving the head assembly. The actuator typically includes an electromagnetic coil motor, usually a voice coil motor, to move the actuator with the head assembly back and forth over a disk surface.

Data is generally stored in each disk in a series of concentric or spiral tracks. These tracks are accessed by one or more read/write heads in the head assembly. A head is mounted to an arm that is in turn mounted to the voice coil motor. During operation, it is necessary to move the head from a current position to a target track in an operation referred to as a "seek" operation. In such a seek operation, a command is provided to the data storage device to access a certain sector on the disk(s). If the head is not positioned over a target track containing the desired sector, a seek profile is determined. The seek profile contains various parameters associated with the head, including acceleration, deceleration, velocity and position information of the head. The seek profile is used to move the head from its current position to the target track by controlling the voice coil motor to move the head to the target track. Periodically, the actual position and velocity of the head are compared to the seek profile and adjustments are made by controlling the voice coil motor.

Once the head is positioned over the target track, the head is maintained over the target track's center line for accurate read/write operations in an operation known as track following. A position error signal (PES) is generated based on variations of the head from the center line of the target track. The PES is part of a closed-loop servo drive system which obtains actual head position information based on a servo pattern and compares the servo pattern to the desired head position information. When the PES identifies a variation, the servo control system provides correctional commands to the voice coil motor to accurately maintain the head over the center line of the target track.

In order to achieve improved mechanical stability and to reduce noise in positioning the head assembly, disk drives also typically employ an actuator mechanism to position the read/write head over the recording surface of the disk.

An actuator assembly designed for a disk contained in a removable shuttle or cartridge must be able to move the read/write head away from the recording disk into a "park position" in order to prevent damages to the head when the disk shuttle/cartridge is either inserted or removed from the drive. Similarly, the actuator assembly also needs to move the read/write head toward the surface of the recording disk into a work position., These are relatively large movements for the read/write head, and a ramped surface is needed to provide highly repeatable loading and unloading movements of the read/write head to maximize usable disk space.

Therefore, there is a need for an invention to provide a highly repeatable loading surface for loading and unloading a read/write head to and away from a surface of a recording medium.

SUMMARY

Advantages of the invention include one or more of the following. The invention provides a simple, low-cost and reliable system for loading and unloading the read-write head to and from the media inside a shuttle. One advantage is that the invention provides a highly repeatable loading/unloading surface for the read-write head. Another advantage of this device is the provision of reliable positioning and smooth transition of the head to and from the media, thus protecting the data stored in the media.

Because the design of this invention is simple, the aforementioned advantages are achieved without increasing the complexity of the drive, thereby increasing the performance and reliability of the entire disk drive system.

In general, in one aspect, the invention features a ramp motion mechanism for loading and unloading a read/write head positioned at an end of an actuator arm in a disk drive, wherein said read/write head accesses and records information upon a disk residing inside a shuttle removable from the disk drive. The ramp motion mechanism consists of a base fixedly mounted in the disk drive, and a nose slidably mounted on the base, the nose has a ramped surface, the surfaces guide the read/write head toward and away from a surface of the disk.

Implementation of the invention may include one or more of the following features. The base may have a protrusion adapted to engage a notch in the nose to lock the nose in an extended position. The base further may be affixed to a lever mounted on a base plate of the disk drive to lock the nose in a retracted position. A plurality of positional and angular orientations may be controlled by applying a force on the nose. They may have angular orientations with six degrees of positional and angular freedom in three dimensions. The force may be applied to a particular area on the nose resulting in a reaction force to the force located at a plurality of pads on the nose.

In another aspect, the invention is directed to a method for loading and unloading a read/write head to and from an edge of a disk surface. The method includes one or more of the following. Moving a ramped surface of a fork of a ramp motion mechanism movably affixed to a static base of the mechanism toward the edge of the disk surface to receive the read/write head. It engages a lifter attached to the read/write head to slide along the ramped surface, and it moves the ramped surface away from the edge of the disk to remove the read/write head away from the surface of the disk.

The method may control the fork in a plurality of angular and positional orientations by applying a force to the fork and obtaining a reaction force from a plurality of pads on the fork. The fork may have at least two fixed positions on the base. The base and the fork may be formed of plastic.

In yet another aspect, the invention is directed to a device for loading and unloading a read/write head to and from an edge of a disk surface. The device having a static ramp and a ramp nose, the ramp nose sliding in a channel formed on a top surface of the static ramp to provide precise, repeatable pathway for loading and unloading the read/write head.

In another aspect, the invention is directed to a method for loading and unloading a read/write head to and from an edge of a disk mounted in a disk drive. The method providing a ramp motion device including a static ramp and a ramp nose sliding in a channel formed on a top surface of the static ramp. The ramp nose providing a pathway for loading and unloading the read/write head, and controlling the ramp nose in angular and positional orientations by applying a force to the ramp nose. The ramp nose may have a plurality of pads which supplies a reaction force in response to the applied force. The method may provide a lever affixed to a base plate of the disk drive, and may apply the force to the ramp nose.

In another aspect, the invention is directed to a ramp motion device for loading a read/write head, having a movable nose adapted to engage the read/write head, a support base whereupon the movable nose moves between two positions in a channel on the support base to move toward and away from a surface of a disk, and a plate lever, fixedly mounted on a base plate of a disk drive and attached to the support base at a first end, to place the movable nose in the two positions. The nose and the support base may be plastic. The second end of the plate lever may be attached to a spring. The lever may be metallic. The read/write head may be attached to the distal end of an arm of an actuator of the disk drive.

DETAILED DESCRIPTION

Figure 1:
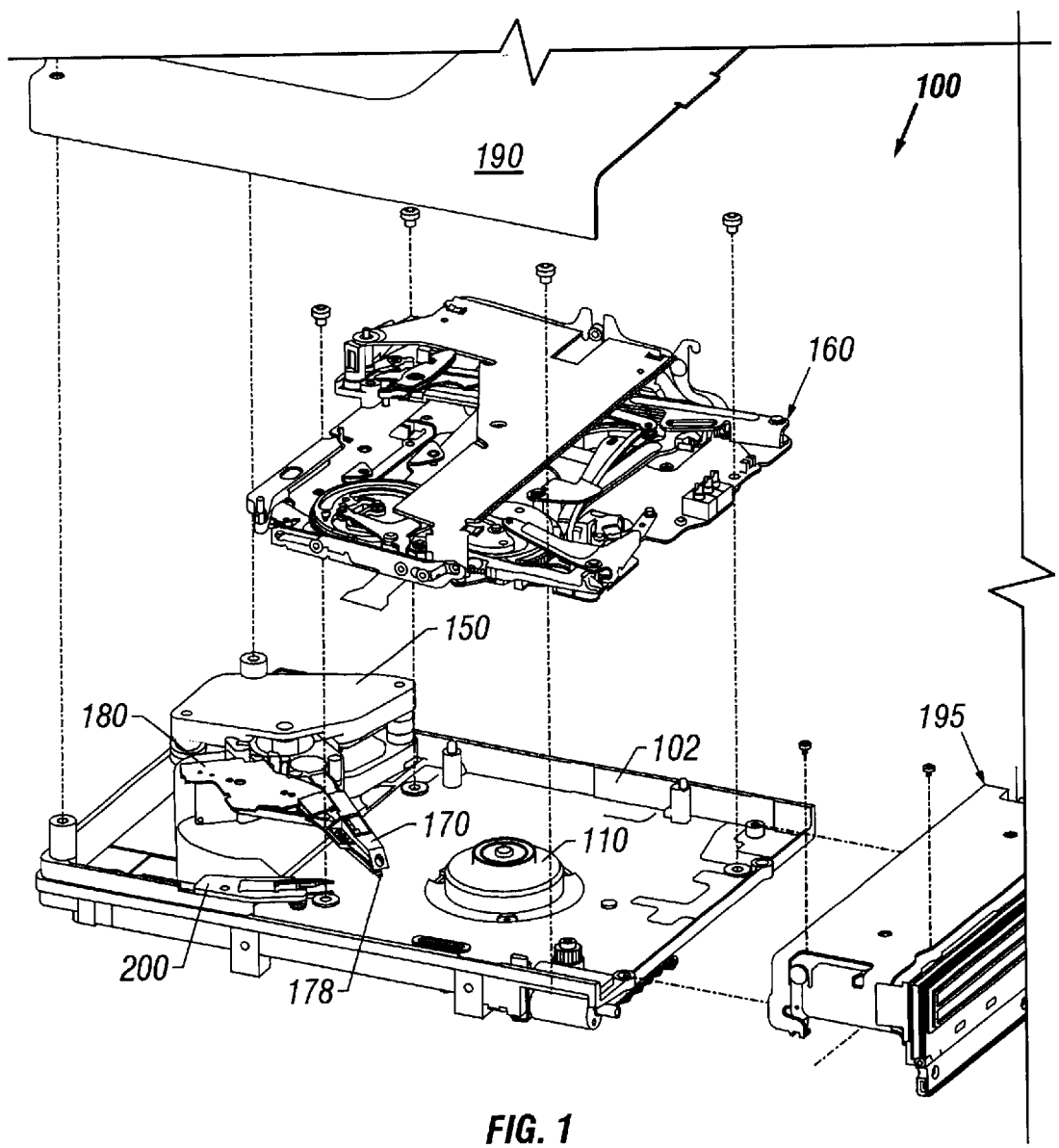
FIG. 1 is an assembly diagram of an optical data storage device.

Referring to FIG. 1, an exploded view of an optical data storage device is shown. A loader assembly 160 is positioned over the spindle motor 110 within the base plate 102. The loader assembly 160 accepts a cartridge containing a shuttle with disk, and the disk cartridge is used to minimize contamination by keeping a disk out of reach of a user at all times.

In one implementation, the read/write head is a "flying" head which is suspended over an optical media by an air-bearing surface in a near-field recording configuration where the phasing between an exit facet of the flying head and a recording layer in the media is a fraction of a wavelength. The flying head includes a near-field lens with a high index of refraction and usually has a near-field condition. A focus beam with a spot size smaller than that obtainable from a conventional optical system is achieved due to the use of this high index solid immersion lens as the near-field lens. The optical read/write head of this embodiment is described in more detail in U.S. patent application Ser. No. 08/846,916, entitled "ELECTRO-OPTICAL STORAGE SYSTEM WITH FLYING HEAD OR NEAR-FIELD RECORDING AND READING," filed on Apr. 29, 1997 and issued as U.S. Pat. No. 6,243,350, the disclosure of which is incorporated herewith by reference.

Referring back to FIG. 1, a data storage device base assembly 100 is shown. The assembly 100 has a base plate 102 which is adapted to receive a spindle motor 110. The spindle motor 110 rotates one or more data storage media such as optical disks or platters (not shown). The spindle motor 110 is attached to the base plate 102.

Also attached to the base plate 102 is the actuator assembly 150 with an actuator body 180, arm 170, and a "flying" head 178. The flying head 178 is suspended over the optical media by an air-bearing surface in a near-field recording configuration. A rotary actuator is used as a coarse positioned for the data storage drive, although other positioning devices may also be used. An optics module containing the flying head is attached to an actuator arm 170 of the actuator assembly 150. Any user data sector on the optical media may be addressed with a read/write beam by adjusting the rotary actuator and turning a galvo mirror (not shown). The actuator assembly 150 is described in more detail in U.S. patent application Ser. No. 09/205,350, entitled "Voice Coil Motor Assembly" filed on Dec. 3, 1998 and abandoned.

The flying head 178 accesses an optical media on a platter (not shown) which can be writable/erasable materials (i.e., write-many-read-many), write-once-read-many materials, and read-only materials. The writable/erasable materials are the magneto-optic type, including but not limited to, rare earth materials.

The ramp motion mechanism 200 is attached to base plate 102 to provide a pathway for loading and unloading flying head 178. In one embodiment, the ramp motion mechanism 200 is made of plastic.

To complete the assembly 100, a cover 190 is screwed into the base plate 102. Further, a face plate assembly 195 is mounted to the front of the base plate 102 to provide data access information to the user through light-emitting diodes (LEDs).

Figure 2:
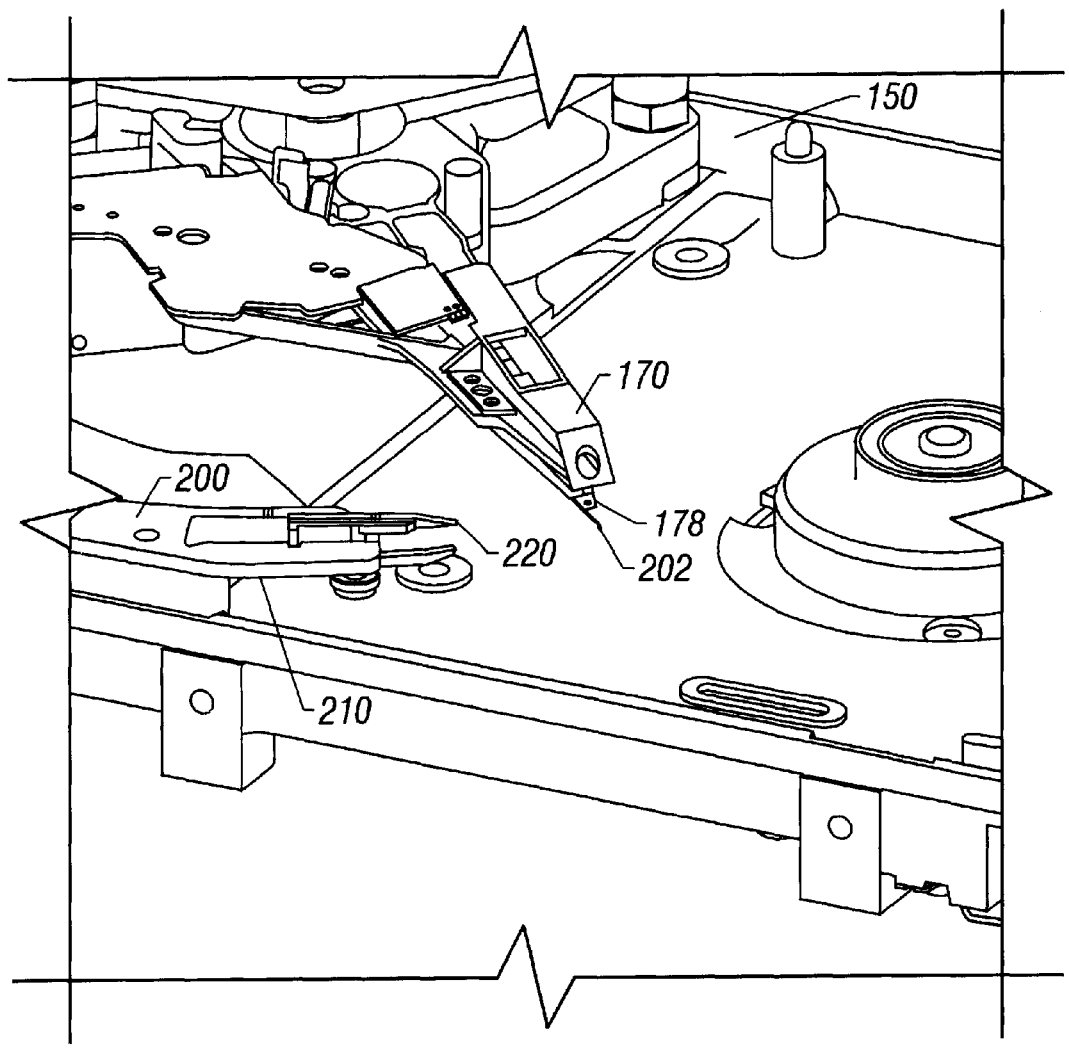
FIG. 2 is a perspective view of the actuator assembly and the ramp motion mechanism.

FIG. 2 shows a detailed blown-up view of the actuator assembly 150 and the ramp motion mechanism 200. The ramp motion mechanism 200 includes a stationary ramp, also called the static ramp or the support base, 210, and a dynamic ramp nose, or fork, 220. Actuator assembly 150 includes the actuator arm 170, lifter 202, and the read/write head 178. Read/write head 178 is described as a flying head above, but it can be a number of other commercially available read/write heads.

Figure 6A:
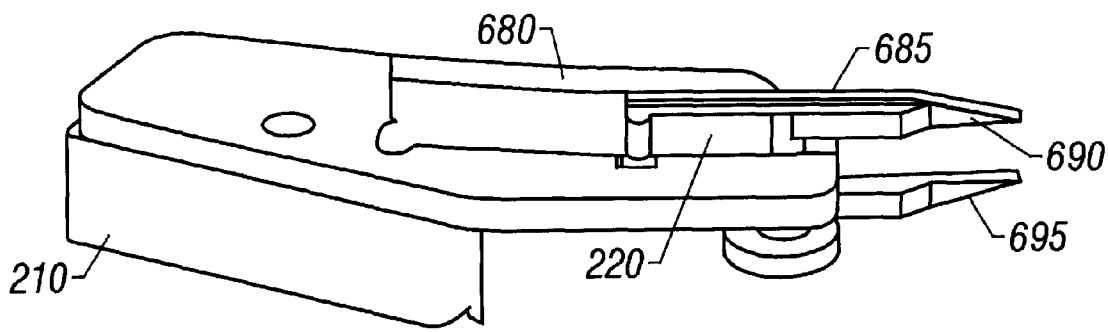
FIG. 6A shows the contact surfaces of the ramp motion mechanism.

In loading or unloading operations, lifter 202 contacts surface 680, which is a part of the static ramp 210, and surface 685, which is a part of the nose 220, as shown in FIG. 6A. For dual read/write heads, the bottom surface 695 of the nose 220 and a corresponding part (not shown) of the static ramp 210 will also be used.

Figure 3:
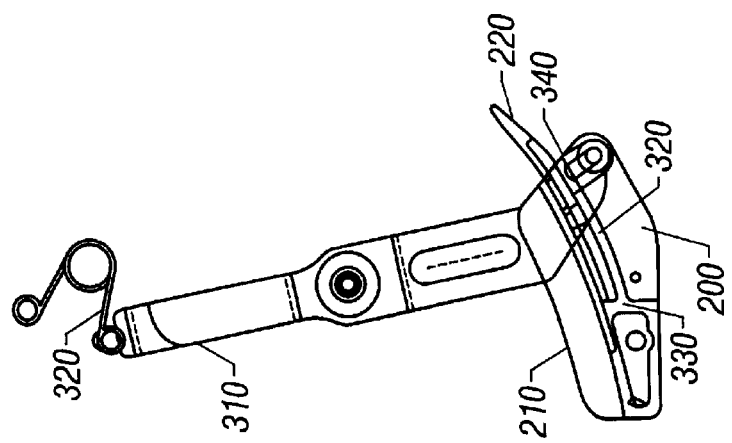
FIG. 3 is the top view of one embodiment of the ramp motion mechanism.

Referring to FIG. 3, the ramp motion mechanism 200 is shown in the top view, with ramp nose 220 in extended position. The ramp motion mechanism 200 has two stable positions, retracted and extended positions. These two positions are distinguished by the position of the ramp nose 220 relative to the static ramp 210. Ramp nose 220 slides between the two ends of the channel 320 situated on the top surface of the static ramp 210. At end 330 of channel 320, the ramp nose 220 is in retracted position. At end 340 of channel 320, the ramp 220 is in extended position. In the retracted position, the ramp nose 220 is inward on the static ramp 210. In the retracted position, the ramp motion mechanism 200 provides maximum clearance for a disk cartridge to move into a loaded position. Channel end 330 stops the motion of the ramp nose 220. In the extended position the ramp nose 220 is extended out from the static ramp 210. The ramp motion mechanism 200 is held in this position to provide a pathway for the read/write head 178 to load smoothly onto the disk.

The accurate positioning and angular orientation of the ramp nose 220 are important because they control the landing site of the read/write head 178. The ramp nose 220 is accurately controlled by the way it "docks" with the static ramp 210. The surfaces and shapes of the static ramp 210 and ramp nose 220 are such that the position and angular orientation of the ramp nose are controlled completely in all six positional and angular degrees of freedom (the three axes and three angles). This is accomplished by means of the applied force and reaction forces that push on the ramp nose to be explained infra.

The ramp nose 220 is held in one of these two positions by the force exerted by lever 310. Lever 310 in one implementation is attached to the base plate of the disk drive and is therefore also called plate lever. At the other end of lever 310 there is a spring torsion 320. As lever 310 moves from end 330 to end 340, or vice versa, spring 320 passes a center position, on either side of which spring 320 produces a force to push lever 310 until lever 310 is stopped by the ramp motion mechanism 200. In one embodiment, lever 310 is made of metal.

Figure 4A:
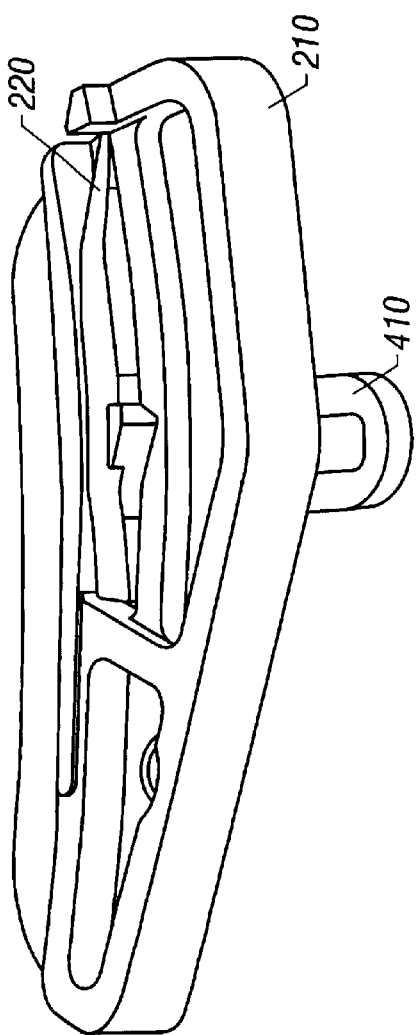
FIG. 4A is the perspective view of the ramp motion mechanism of FIG. 3.
Figure 4B:
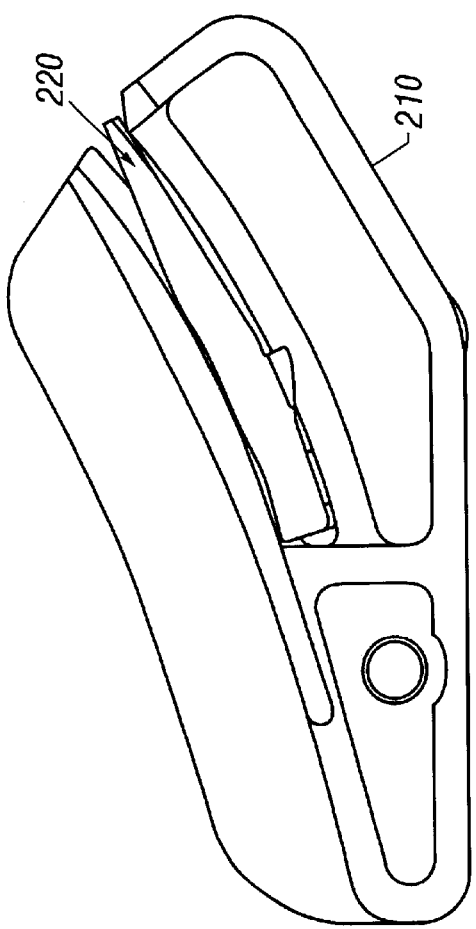
FIG. 4B is the top view of the ramp motion mechanism of FIG. 4A.
Figure 4C:
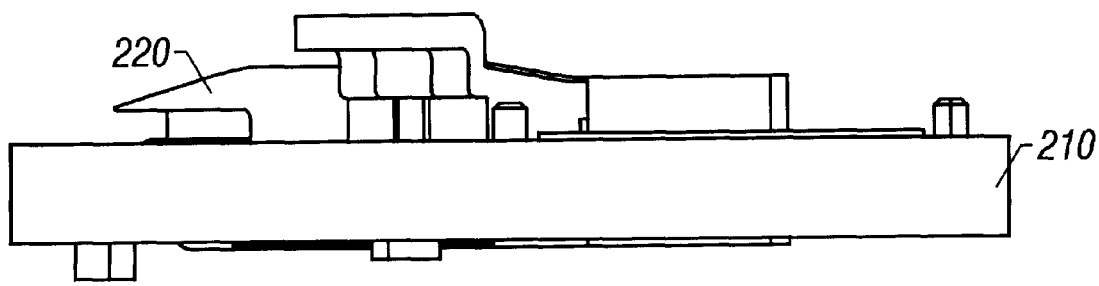
FIG. 4C is the side view of the ramp motion mechanism of FIG. 4A.
Figure 5:
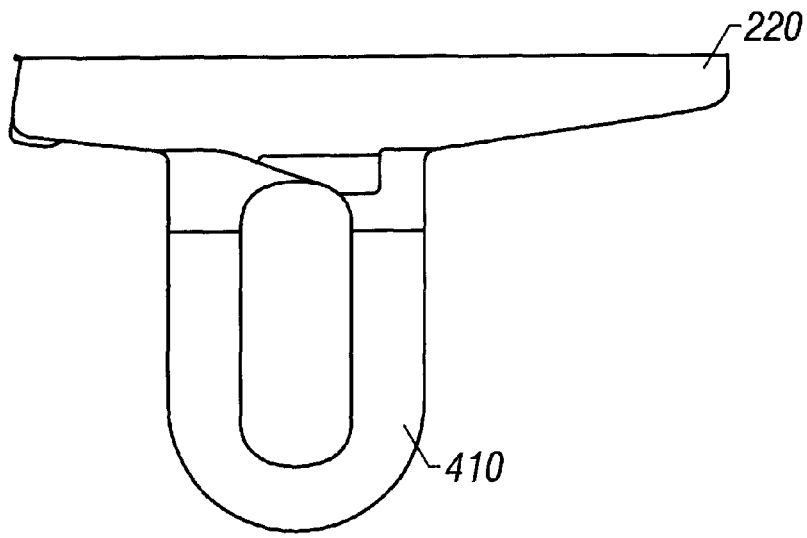
FIG. 5 is the top view of the ramp nose.

FIGS. 4A—4C show the perspective, top, and side views of the ramp motion mechanism 200 respectively. FIG. 5 shows the top view of the ramp nose 220. Ramp nose 220 has loop 410, which is where lever 310 applies a force.

FIG. 6A shows the contact surface 680, which is a part of static ramp 210, and contact surface 685, which a part of nose 220. In loading and unloading, lifter 202 contacts surfaces 680 and 685. The distal end 690 of nose 220 is at a shallow angle of 20 degrees or less for loading and unloading a read/write head 178.

Figure 6B:
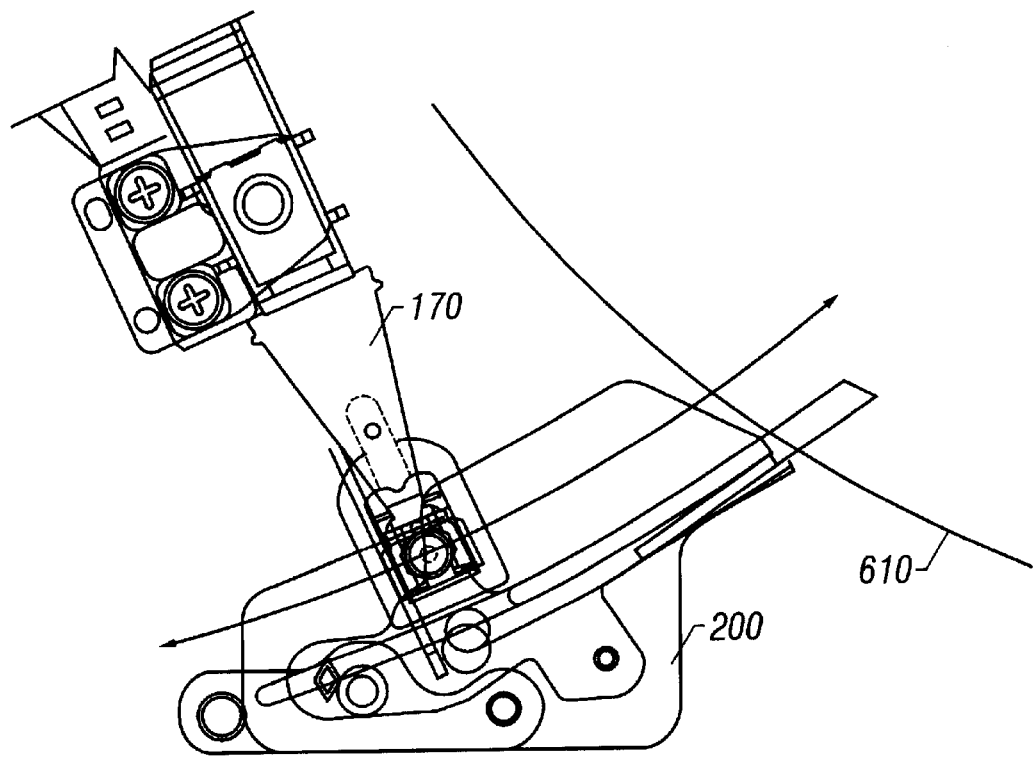
FIG. 6B is the ramp motion mechanism in extended position with the actuator arm.
Figure 6C:
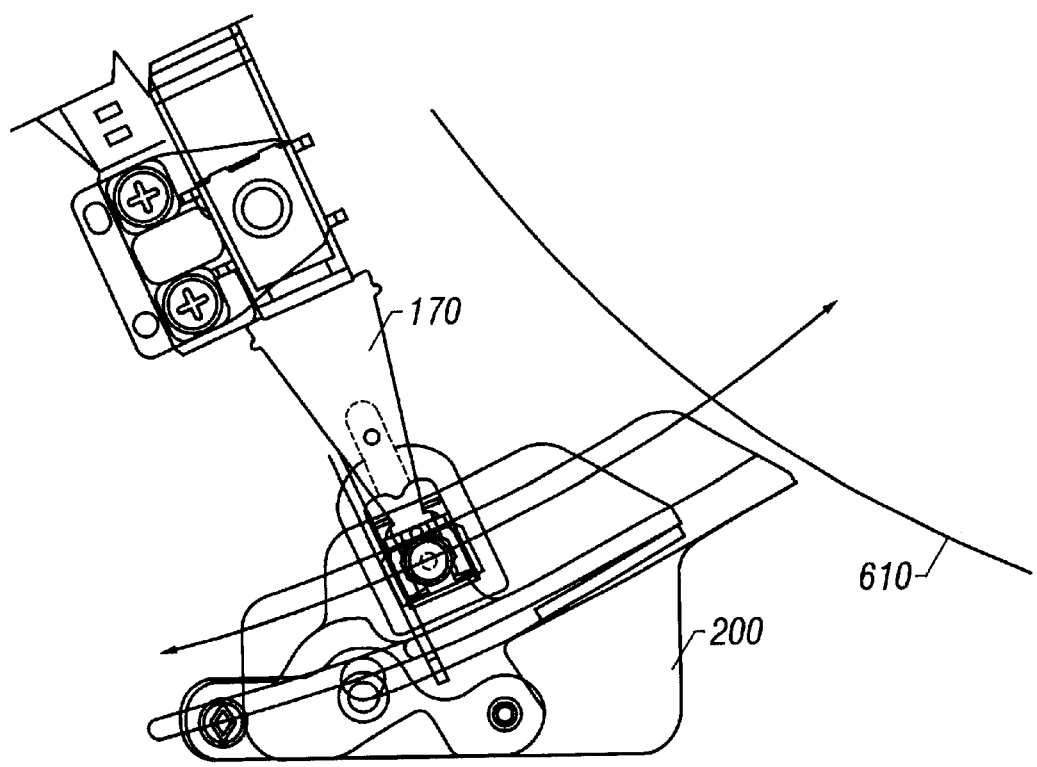
FIG. 6C is the ramp motion mechanism in retracted position with the actuator arm.

FIG. 6B shows the ramp motion mechanism 200 in the extended position as it is ready to load into and unload from disk 610. FIG. 6C shows the ramp motion mechanism 200 in the retracted position.

Figure 7A:
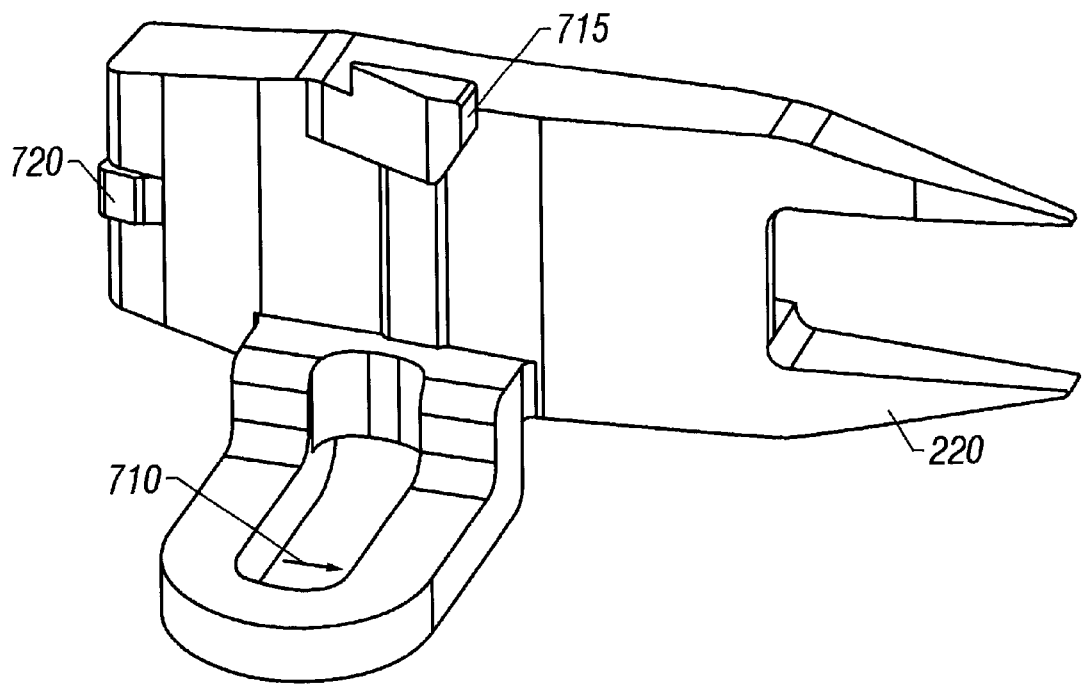
FIG. 7A shows the reaction pads on the first side of the ramp nose.
Figure 7B:
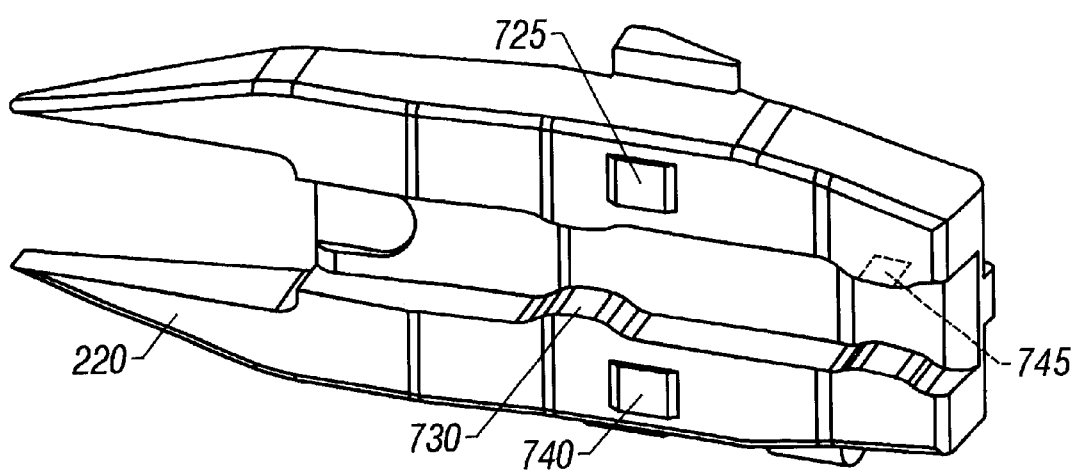
FIG. 7B shows the reaction pads on the second side of the ramp nose.

FIGS. 7A and 7B show a plurality of reaction pads present on the ramp nose 220 to provide reaction forces that push on the ramp nose 220 as it receives a force from lever 310 at location 710. Reaction pads 720 and 715 are on one side of the nose 220, and reaction pads 725, 730, 740, and 745 are on the other side of the nose 220. As lever 310 applies a force to nose 220 at location 710, reaction forces to this applied force are located at the reaction pads on both sides of nose 220. These pads dock the ramp nose 220 in the desired position and angular orientation. The ramp nose 220 is precisely controlled by the way it "docks" with static ramp 210. The surfaces and shapes of the static ramp 210 and ramp nose 220 are such that the position and angular orientation of the ramp nose 220 are controlled completely in six degrees of freedom in three dimensions. Thus, the ramp motion mechanism 200 provides precise, repeatable pathway for loading and unloading read/write head 178 unto and from disk 610.

Although the present invention has been described in detail with reference to the embodiments therein, one ordinarily skilled in the art to which this invention pertains will appreciate that various modifications and enhancements may be made without departing from the spirit and scope of the following claims. For example, the ramp motion mechanism can be used to engage two or more read/write head simultaneously attached to the actuator to access information of two or more recording disks.

What is claimed is:

1. A ramp motion mechanism for loading and unloading a read/write head positioned at an end of an actuator arm in a disk drive, wherein said read/write head accesses and records information upon a disk residing inside a shuttle removable from the disk drive, said ramp motion mechanism comprising:
   a base fixedly mounted in said disk drive;
   a nose-holding unit mounted on said base; and
   a nose slidably mounted to said nose-holding unit on said base, said nose having a top surface and a bottom surface, each of said top and bottom surfaces having a ramp structure thereon and wherein said surfaces guide the read/write head toward and away from a surface of said disk.

2. The mechanism of claim 1, wherein said nose includes a notch and said base further comprises a protrusion adapted to engage said notch in said nose to lock said nose in an extended position.

3. The mechanism of claim 1, further comprising a level mounted on a base plate of the disk drive and engaged to said nose, said level movable to side said nose in a retracted position and an extended position.

4. The mechanism of claim 3, further comprising a plurality of reaction pads on said nose to control a plurality of positional and angular orientations of said nose under action of a force.

5. The mechanism of claim 4, wherein the plurality of positional and angular orientations comprises six degrees of positional and angular freedom in three dimensions.

6. The mechanism of claim 3, wherein said nose includes a loop at which said level is engaged to said nose.

7. A device for loading and unloading a read/write head to and from an edge of a disk surface in a disk drive, comprising:
   a static ramp;
   a nose-holding unit formed on said static ramp and having a channel formed on a top surface of the static ramp to provide precise, repeatable pathway for loading and unloading the read/write head; and
   a ramp nose movably engaged to said nose-holding unit to slide in said channel between two positions.

8. The device of claim 7, further comprising a lever having a first end engaged to a base of the disk drive and a second end engaged to said ramp nose, said lever movable to change a position of said ramp nose along said channel.

9. The device of claim 8, wherein said ramp nose includes a loop to which said lever is engaged to apply a force on said ramp nose.

10. The device of claim 9, wherein said ramp nose further comprises a plurality of reaction pads to apply forces on said ramp nose to confine position and orientation of said ramp nose.

11. The device of claim 10, wherein said reaction pads are located on two opposite sides of said ramp nose.

12. The device of claim 7, wherein said nose has a distal end that forms an angle less than about 20 degrees.

13. A ramp motion device for loading a read/write head, comprising:

a movable nose adapted to engage the read/write head;

a support base having a channel, said movable nose movably engaged to said channel to move between two positions in said channel to move toward and away from a surface of a disk; and a plate lever, having a first end mounted on a base plate of a disk drive and a second end attached to said movable nose on the support base to place the movable nose in the two positions.

14. The device of claim 13, wherein the nose and the support base are plastic.

15. The device of claim 13, further comprising a spring that engages said second end of the plate lever to the base plate of the disk drive.

16. The device of claim 13, wherein the lever is metallic.

17. The device of claim 13, wherein the read/write head is attached to the distal end of an arm of an actuator of the disk drive.

18. A disk drive, comprising:

a disk drive base;

a spindle motor mounted on said disk drive base to hold at least a disk that stores information;

an optical head to couple optical energy to and from the disk for reading information or for writing information on the disk:

an actuator arm engaged to said disk drive to hold said optical head and operable to move said optical head over the disk, a head lifter engaged to said actuator arm to lift said optical head;

a ramp motion mechanism mounted on said disk drive base to load and unload said optical head, wherein said ramp motion mechanism includes:

a ramp base mounted on said disk drive base and having a channel; and a nose slidably mounted to said channel on said ramp base to slide in said channel, said nose having has at least one surface to support said head lifter for said optical head and to guide said optical head during loading and unloading operations.

19. The disk drive as in claim 18, wherein said ramp motion mechanism further comprises a lever having a first end engaged to said disk drive base and a second end engaged to said ramp nose to change a position of said nose along said channel.

20. The disk drive as in claim 18, wherein said nose further comprises a plurality of reaction pads to apply forces to confine position and orientation of said nose.

21. The disk drive as in claim 18, wherein said nose has a distal end that forms an angle less than about 20 degrees to load said optical head to the disk and to unload said optical head from the disk.

* * * * *